US012280347B2

(12) United States Patent
Rossetti et al.

(10) Patent No.: US 12,280,347 B2
(45) Date of Patent: Apr. 22, 2025

(54) MACHINE FOR PREPARING FLUID PRODUCTS AND METHOD FOR PREPARING A FORMULATION OF FLUID PRODUCTS BY MEANS OF SUCH A MACHINE

(71) Applicant: Alfa S.r.l., Bologna (IT)

(72) Inventors: Edoardo Rossetti, Calderara di Reno (IT); Marco Rossetti, Calderara di Reno (IT); Marco Lunghini, Calderara di Reno (IT)

(73) Assignee: ALFA S.R.L., Bologna (IT)

(*) Notice: Subject to any disclaimer, the term of this patent is extended or adjusted under 35 U.S.C. 154(b) by 147 days.

(21) Appl. No.: 17/768,400

(22) PCT Filed: Oct. 1, 2021

(86) PCT No.: PCT/IB2021/059039
§ 371 (c)(1),
(2) Date: Apr. 12, 2022

(87) PCT Pub. No.: WO2022/070154
PCT Pub. Date: Apr. 7, 2022

(65) Prior Publication Data

US 2023/0071789 A1 Mar. 9, 2023

(30) Foreign Application Priority Data

Oct. 1, 2020 (IT) ........................ 102020000023191

(51) Int. Cl.
*B01F 33/85* (2022.01)
*B01F 35/22* (2022.01)
*B01F 101/30* (2022.01)

(52) U.S. Cl.
CPC .......... *B01F 33/85* (2022.01); *B01F 35/2207* (2022.01); *B01F 2101/30* (2022.01)

(58) Field of Classification Search
CPC .. B01F 33/85; B01F 35/2207; B01F 2101/30; B01F 33/841; B01F 33/8442;
(Continued)

(56) References Cited

U.S. PATENT DOCUMENTS 4,749,008 A * 6/1988 Whitney .................. B65B 3/28 141/83
4,913,198 A * 4/1990 Hayahara ............ G05D 11/134 141/237

(Continued)

FOREIGN PATENT DOCUMENTS

EP 0427497 A1 5/1991
WO 2004/098763 A2 11/2004

(Continued)

OTHER PUBLICATIONS

International Search Report issued in corresponding International Application No. PCT/IB2021/059039, date of mailing Jan. 27, 2022 (4 pages).

(Continued)

*Primary Examiner* — Kenneth Rinehart
*Assistant Examiner* — Stephanie A Shrieves
(74) *Attorney, Agent, or Firm* — FLYNN THIEL, P.C.

(57) ABSTRACT

A machine for preparing fluid products has a dispensing module with a tank for fluid products. The tank is connected to a pump device for dispensing measured quantities of fluid product in an operating dispensing zone of the dispensing module. The dispensing module has a transport device for transporting a container from an inlet to an outlet which are different from each other, by passing through the operating dispensing zone in which the container is selectively located. The machine further includes an inlet and an outlet which are mutually different, for introducing and removing to/from the machine a container, in which to dispense (Continued)

measured quantities of fluid products to obtain a finished fluid product. The inlet of the machine communicates with continuity of transport with an inlet of a dispensing module, and the outlet of the machine communicates with continuity of transport with an outlet of a dispensing module.

13 Claims, 5 Drawing Sheets

(58) Field of Classification Search
CPC .. B01F 33/848; B01F 35/7176; B01F 35/882; B67D 7/302; B65G 15/06; B65G 15/12; B65G 2201/0244; B65G 2203/0216; B65B 43/59; B65B 1/04
USPC ............................................ 141/2, 121, 129
See application file for complete search history.

(56) References Cited

U.S. PATENT DOCUMENTS 5,083,591 A * 1/1992 Edwards ........... B01F 35/71805 235/462.14
5,365,722 A * 11/1994 Edwards .................. B65B 3/24 53/503
5,584,326 A * 12/1996 Galli ..................... B01F 35/714 366/605
7,624,769 B2 * 12/2009 Bartholomew ....... G07F 13/065 141/2
2005/0252934 A1 * 11/2005 Miller ..................... F16K 23/00 222/135
2007/0091717 A1 * 4/2007 Steinwald .............. G01G 19/22 366/156.1
2011/0010255 A1 * 1/2011 Drocco ................... B01F 33/85 705/17
2018/0117549 A1 * 5/2018 Rossetti .................. G07F 13/06
2018/0229194 A1 8/2018 Blair, II et al.
2019/0143285 A1 * 5/2019 Sang ....................... B41F 31/03 366/141
2021/0252465 A1 8/2021 Shen

FOREIGN PATENT DOCUMENTS

WO 2010/125208 A1 11/2010
WO 2019/217490 A1 11/2019
WO 2019/234255 A1 12/2019
WO 2020/057458 A1 3/2020
WO 2020/057464 A1 3/2020
WO 2020/165822 A1 8/2020

OTHER PUBLICATIONS

Written Opinion issued in corresponding International Application No. PCT/IB2021/059039, date of mailing Jan. 27, 2022 (7 pages).

* cited by examiner

MACHINE FOR PREPARING FLUID PRODUCTS AND METHOD FOR PREPARING A FORMULATION OF FLUID PRODUCTS BY MEANS OF SUCH A MACHINE

FIELD OF THE INVENTION

The present invention relates to a machine for preparing fluid products and a method for preparing a formulation of fluid products by means of such a machine.

The formulations of fluid products to which reference is made in the present description include mixtures, dispersions, solutions and other combinations of fluid products with which covering or protective products for surfaces are obtained. The formulations to which reference is made here comprise varnishes, paints (also called pigmented varnishes), glazes, lacquers, inks and other products of this type. For simplicity, in the present description all these covering or protective products will be called a "lacquer" or "lacquers" which is intended to be understood in a broad sense to indicate both transparent products and coloured products, regardless of the type of compounds (binders, solvents, pigments, etc.) from which they are made.

The invention has been developed with particular regard, though not exclusively, for formulations which are defined by a user in order to produce lacquers in the field of retouching or repair operations, and particularly but in a non-limiting manner retouching or repair operations for parts and bodies of vehicles. However, the vehicle can be used where necessary to prepare in a simple and automatic manner formulations which are defined by the user and which involve the combination of various fluid products available. To this end, the invention also relates to a method for preparing a formulation which is defined by the user from a plurality of fluid products which can be dispensed.

TECHNOLOGICAL BACKGROUND

The preparation of lacquers to be used in retouching or repair operations for parts and bodies of vehicles is carried out by selecting and mixing with each other, in accordance with proportions given by a particular formulation which reproduces the colour and the effects of the body of a vehicle, a given number of fluid products. A typical formulation of lacquer for a body may provide for the combination of from five to fifteen different products, even if simpler and more complex formulations are not excepted. The fluid products to be combined in order to obtain a predetermined lacquer are selected within a wider group which, in accordance with the manufacturers of the components, may provide from a minimum of 50-55 components up to more than 90 different components.

Over time, particularly in the field of lacquers for bodies, this has led to the growth in the complexity of the formulations and the number of fluid products to be used as components of the formulations and therefore to be kept available ready for use has multiplied. This complexity, together with the unit cost of each single component which is often high, makes it costly to prepare the lacquers manually, and there has therefore rapidly increased the need for automating at least partially the activity of preparing the lacquers in accordance with the formulations defined by the user.

In fact, the most common method even nowadays for preparing lacquers for bodies of vehicles is the method of following the formulations by manually weighing the various components which are gradually poured into a container which is positioned on a set of scales to two decimal places. After the container of a component has been opened for the first time, it is closed again with a special cap and placed on a shelf until the subsequent use. This operating method, in addition to being long and tedious, has high risks of errors during the production of the lacquer which are not always capable of being corrected and which in any case lead to a waste of components. Furthermore, if the containers are not closed properly and stored correctly, the components can dry out or in any case deteriorate with sometimes substantial economic losses which result therefrom.

In an effort to increase the productivity and to reduce human errors, there have been proposed a number of machines for use in the preparation of lacquers for retouching or repair operations for bodies of vehicles.

WO2019/234255 (Corob) describes a machine which provides for the automatic dispensing in accordance with a given formulation of a given number of different components which are manually loaded in the machine by an operator. The components are kept in containers which are each provided with a respective pump and stored on a suitable shelving unit. The containers of the fluid products necessary for producing a given formulation are taken from the shelving unit and are juxtaposed in receptacles which are provided in a working zone. The pumps of each container are used sequentially by a motor which controls the dispensing of each fluid component into an initially empty container which is placed on a set of scales. Each fluid component is weighed until reaching the quantity predetermined by the specific formulation.

The system of WO2019/234255 requires demanding manual intervention. In fact, the operator has to take from the shelving unit the various containers of fluid products required by the desired formulation and to load them in the receptacles of the working zone. The operator must then wait for all the components to have been dispensed before being able to remove the container of the finished lacquer to be used. Before carrying out another formulation of fluid product, the operator has to replace the containers of the completed formulation in position in the shelving unit and to remove the ones necessary for the subsequent formulation.

Another disadvantage of the system of WO2019/234255 is the fact that the measurement of the fluid components to be dispensed is carried out by weight, in accordance with the so-called gravimetric method which does not allow a high level of productivity. In fact, as the weight of the fluid component dispensed approaches the quantity provided for by the formulation, the dispensing has to slow down in order to prevent the required measurement being exceeded. A potential dispensing error involving an excess involves the need to correct the formulation with time and fluid components being wasted. Another problem of the system of WO2019/234255 is the fact that the fluid components which are used less and which are stored for a long time in the containers on the shelving unit tend to settle or become separated and thereby become unusable or, worse, impair the preparation of a lacquer or damage the dispensing pump at the time when they are used without the degradation thereof being noticed.

WO2020/057458 describes a machine which is very similar to the preceding one, with the difference that the metering of the components can be carried out by measuring the volume dispensed by the volumetric pumps. This apart, the machine of WO2020/057458 has all the other disadvantages and problems set out above. A common problem for both of the machines is the fact that the receptacles in the working zone which are provided to receive the containers of fluid products are limited in terms of number. This could constitute an obstacle to producing any formulations which involve the combination of a number of fluid components which exceeds the number of receptacles provided in the working zone.

Given the increasing tendency of lacquer manufacturers to propose formulations of fluid products which are more and more complex, the machines of the prior art could be inadequate and it would therefore be necessary to completely replace them or to go to great lengths for a costly adaptation thereof.

WO2020/057464 describes a machine which operates according to a different principle which is similar to the one of the universal dye dispensing machines for producing paints at the point of sale. As known, a dye dispensing machine comprises a given number of tanks, in which the dye is agitated continuously so as not to dry out, precipitate or become separated. There is associated with each tank a pump, normally of the volumetric type, which dispenses the quantity of dye desired into a container. The dye dispensing machines can dispense a limited number of dyes and rarely comprise more than 32 tanks which are mounted on-board. WO2020/057464 describes a dispensing machine for use in the field of retouching and repair operations in the sector of bodies which is formed by three dispensing units, each of which is substantially similar to a conventional dispensing machine with 32 tanks. Generally, therefore, the machine described in WO2020/057464 can manage up to 96 different fluid components, which makes it suitable for use for formulations being used for the bodies of vehicles. The three dispensing units are arranged in a pyramid-like manner in order to obtain a relatively compact machine. The container which receives the finished lacquer is introduced in an empty state into the machine through a door and is transported from one dispensing unit to another in accordance with the fluid component which has to be dispensed there in accordance with the specific formulation. In order to reach the two lateral dispensing units, the container is moved transversely by means of transporter belts. The central dispensing unit, which rises above the two lateral dispensing units, is reached with a vertically movable stool. When all the fluid products provided by the formulation have been dispensed, the container with the finished lacquer is returned to the door, from where the operator can remove it.

The machine described in WO2020/057464 allows the production of formulations of fluid products substantially automatically, solving many of the problems of the machines discussed above. However, this machine is very bulky and it is particularly complex to provide for the maintenance and cleaning thereof. Furthermore, it is a very inflexible machine which is disproportionate if the number of fluid components to be kept ready for use in total is small, but is unusable if it is necessary to keep available more than 96 different components. Another problem of the machine of WO2020/057464 is the fact that it is impossible to use it effectively if the formulation of the fluid products provides for the addition of a binder component, or resin, at high quantities. In fact, there are lacquer manufacturers, the formulations of which provided, for example, for approximately 80 fluid components to be combined with a binder component which is also involved in the formulation at a rate of up to 50% by weight or volume. In these cases, the binder component could not be dispensed by the machine described in WO2020/057464 and would have to be added manually with the obvious disadvantages which would result from this.

STATEMENT OF INVENTION

An object of the present invention is to overcome one or more of the disadvantages of the prior art by providing a machine for preparing fluid products, such as, for example, varnishes, paints, glazes, inks, lacquers and other products of the type, which are generally called "lacquers" or "finished fluid products" in the present description, which has a high level of productivity combined with just as high a level of flexibility in use. Another object of the invention is to provide a machine which is simple to use. Another object of the invention is to provide a machine which minimizes the waste of products for preparing lacquers. Yet another object is to provide a machine which is reliable over time and which ensures the precise repeatability of the formulations of fluid products, both in small quantities and in large ones.

In order to achieve these objects and other objects, the invention relates to a machine for preparing fluid products. The invention also relates to a method for preparing fluid products by means of such a machine.

According to a first aspect, there is described a dispensing module for selectively dispensing one or more fluid products into a container. The dispensing module may comprise one or more tanks for fluid products. Each tank may be connected to at least one respective pump device for dispensing upon request a measured quantity of a fluid product which is contained in the tank. The dispensing module comprises at least one operating dispensing zone, at which one or more fluid products can be dispensed. The dispensing module may comprise at least one transport device for transporting at least one container for fluid products from at least one inlet to at least one outlet for containers of the dispensing module. At least one inlet and at least one outlet are mutually separate and different. Preferably, the transport device comprises a motorized roller conveyor, a transporter belt, or other members of the type.

According to another aspect, there is described a machine which may comprise at least one of the above-mentioned dispensing modules. In accordance with the number of dispensing modules, the mutual arrangement thereof and the configuration of each of them, the machine may comply with greater or lesser requirements in terms of the number of fluid products which can be dispensed at the same time, number of fluid products which are simultaneously available and ready for being dispensed, number of containers which can be in use in the machine at the same time, speed of execution of the formulations, quantity of fluid products which can be dispensed, time required for completing the formulations.

The machine may be provided with at least one supply device for supplying one or more containers, preferably sequentially, to at least one inlet of a dispensing module. Therefore, there can be provided a plurality of containers which are automatically supplied to the machine for carrying out corresponding formulations without any need for an operator to intervene for inserting each container. Furthermore, it is not necessary to wait for the conclusion of a formulation with complete dispensing of the fluid products into a container before being able to introduce into the machine another container, in which to dispense the fluid products of a subsequent formulation. The supply device can be completely or partially motorized and may comprise, for example, a motorized roller conveyor, a transporter belt, or other members of the type. The supply device may completely or partially comprise a chute which does not require any power supply.

The machine may be provided with at least one collection device for collecting one or more containers which are being discharged from the dispensing module. The collection device may be completely or partially motorized and may comprise, for example, a motorized roller conveyor, a transporter belt, or other members of the type. The collection device may completely or partially comprise a chute which does not require any power supply.

Therefore, the machine may comprise at least one inlet for introducing containers, in which to dispense fluid products. The machine may comprise at least one outlet, from which there are discharged the containers in which the fluid products have been dispensed. At least one inlet and at least one outlet of the machine are mutually separate and different. The measured quantities of fluid products are dispensed into the containers in order to obtain a formulated fluid product. At least one transport path extends between the at least one inlet and the at least one outlet, which are different, of the machine. At least some of the transport path comprises the at least one transport device of the at least one dispensing module. The containers travel the transport path and are located under one or more operating dispensing zones in order to receive a measured quantity of fluid products which is predetermined in accordance with a formulation of finished fluid product. The transport path of the containers may comprise at least one container supply device and/or at least one container collection device.

According to a particular aspect, the machine may comprise at least two dispensing modules which are mutually adjacent, one above the other or juxtaposed. The machine may be configured in such manner that at least two dispensing modules are placed side by side, with an inlet of one of the two dispensing modules being arranged so as to continue the path with respect to an outlet of the other dispensing module. In this manner, the containers can be transported continuously from one dispensing module to another so as to pass sequentially into the operating dispensing zones. The containers can be introduced into the machine by at least one inlet, which is preferably provided with a supply device, and pass sequentially all the operating dispensing zones of fluid products until being discharged from at least one outlet of the machine, which is different from the inlet from which they were introduced and where a collection device may be arranged in a preferable but non-limiting manner.

A great advantage of the machine according to the invention is the fact that it is modular, being constructed by means of any number of dispensing modules, each of which is autonomously capable of dispensing a given number of fluid products inside the same container which is transported by the transport device of the dispensing module. In this manner, the machine can be supplied at the desired size, both with regard to the number of fluid products which can be ready on-board and used to produce the formulation, and with regard to the space occupied at the destination location, because the dispensing modules can be juxtaposed horizontally or vertically, obtaining various configurations of the machine.

According to a particular aspect, in fact, at least two dispensing modules can be positioned one above the other so as to define at least two levels of the machine. The transport system can therefore comprise at least one vertical transport member for transporting the containers from one level to another of the machine, along the continuous transport path from the inlet to the outlet thereof. According to a preferred aspect, the vertical transport member is a lifter, elevator or descender. The terms "lifter", "elevator" and "descender" must be understood in the generic sense of devices which allow one or more objects to be transferred in a vertical direction without any limitation with regard to the direction of transfer, whether upward or downward. Preferably, the transport system also comprises the transport devices of the dispensing module or modules of the machine which will constitute horizontal portions.

The machine can be configured in such a manner that each of the levels thereof comprises one, two or three dispensing modules, each of which may preferably comprise from one to sixteen tanks of fluid products. It is thereby possible to produce a machine configuration which in a limited space is capable of storing and automatically dispensing up to ninety-six different fluid products.

In any case, regardless of the size thereof, the machine according to the invention may produce lacquers with formulations which are also very complex, being able to use for each formulation any number of the lacquer components available without any limit except the total number of components stored in the various dispensing modules of the machine.

For dispensing fluid products in each dispensing module, there can be used any dispensing device of known type. However, for advantageously producing the machines of the present invention, it has been found to be particularly advantageous and effective to use the dispensing device for fluid products which has been developed by the same Applicant and which is used in the commercially known machines under the name Thor Tinting, and which is described in detail in the patent application WO2020/165822, the content of which is integrally claimed and incorporated herein by reference, as if it were an integral part of the present description.

Another significant advantage of the machine according to the invention is the saving obtained by minimizing the waste of components of the formulations of lacquers. The machine operates in accordance with the volumetric dispensing principle, wherein the quantity of component required by the formulation of the lacquer is precisely dispensed. Therefore, imprecisions of the gravimetric systems which often require corrections of the formulation are prevented.

Another advantage of the machine according to the invention is being able to produce finished lacquers without any effort and upon request, both in very small quantities, for sampling and tests, and in great quantities, for example, for re-painting large portions of a vehicle after the tests which have been carried out with the sample have been found to be satisfactory. The machine may, for example, dispense, for example, by controlling a dispensing selector in one or more dispensing modules, quantities of fluid product from approximately 20 ml to approximately 1000 ml. This constitutes a substantial saving because the operator can test beforehand a small quantity of finished lacquer and can decide only after a positive inspection to produce all the quantity necessary for repainting the vehicle. To this end, each dispensing module may comprise a dispensing selector in order to selectively dispense small quantities of fluid product for producing samples of lacquers or large ranges of fluid product for rapidly filling large lacquer containers.

Another important advantage of the machine according to the invention is the simplicity of use thereof. The production of the finished fluid product is in fact carried out in a completely automatic manner without any need for intervention by an operator. The machine of the present invention allows different lacquers to be produced sequentially without any manual intervention. The machine is further capable of starting the production of a new lacquer without waiting for the production of the preceding lacquer to be finished. This constitutes a substantial advantages in terms of both productivity and ease of use. In fact, it is not necessary for an operator to unload the machine with respect to a finished lacquer because the machine starts to produce the subsequent lacquer. The functions of the operator are thereby optimized because the operator is not constrained by servicing the machine at the end of the production of each lacquer. In other words, the machine no longer remains waiting for the intervention of an operator at the end of each formulation of lacquer, but can continuously produce a series of pre-programmed lacquers. For information purposes, the machine can emit a sound, light and/or telematic message at the end of each production of lacquer, but it is not necessary for an operator to leave his/her duties in order to immediately service the machine with a resultant optimization of time and procedures.

Therefore, there is described the use of the above-mentioned machine for preparing formulations which are defined by the user, wherein each formulation comprises a plurality of fluid products to be dispensed into a respective container. The fluid products are stored in the tanks of the dispensing modules and the formulations are ordered sequentially. The preparation of a formulation provides for the introduction of a container into the machine through the inlet thereof before the container in which the preceding formulation of the sequence is prepared has left the machine.

The sequence of formulations can be optimized, for example, by a programme for a processor which is provided for the purpose, ordering the list of formulations on the basis of one or more parameters which include: type, number and quantity of fluid products to be dispensed for each formulation, storage position of the fluid products in the two or more dispensing modules, quantity of lacquer to be prepared, capacity of the container in which to dispense the formulated product, priority of use of the lacquer to be prepared. The optimization of the sequence of formulations, together with the fact that the preparation of a formulation can be started before the preparation of the preceding formulation has finished, allow an increase in the productivity of the machine with respect to the prior art, reducing the time and the frequency of intervention of an operator.

BRIEF DESCRIPTION OF THE DRAWINGS

Additional features and advantages will be appreciated from the following detailed description of a preferred embodiment with reference to the appended drawings which are given by way of non-limiting example and in which.

DETAILED DESCRIPTION

Figure 1:
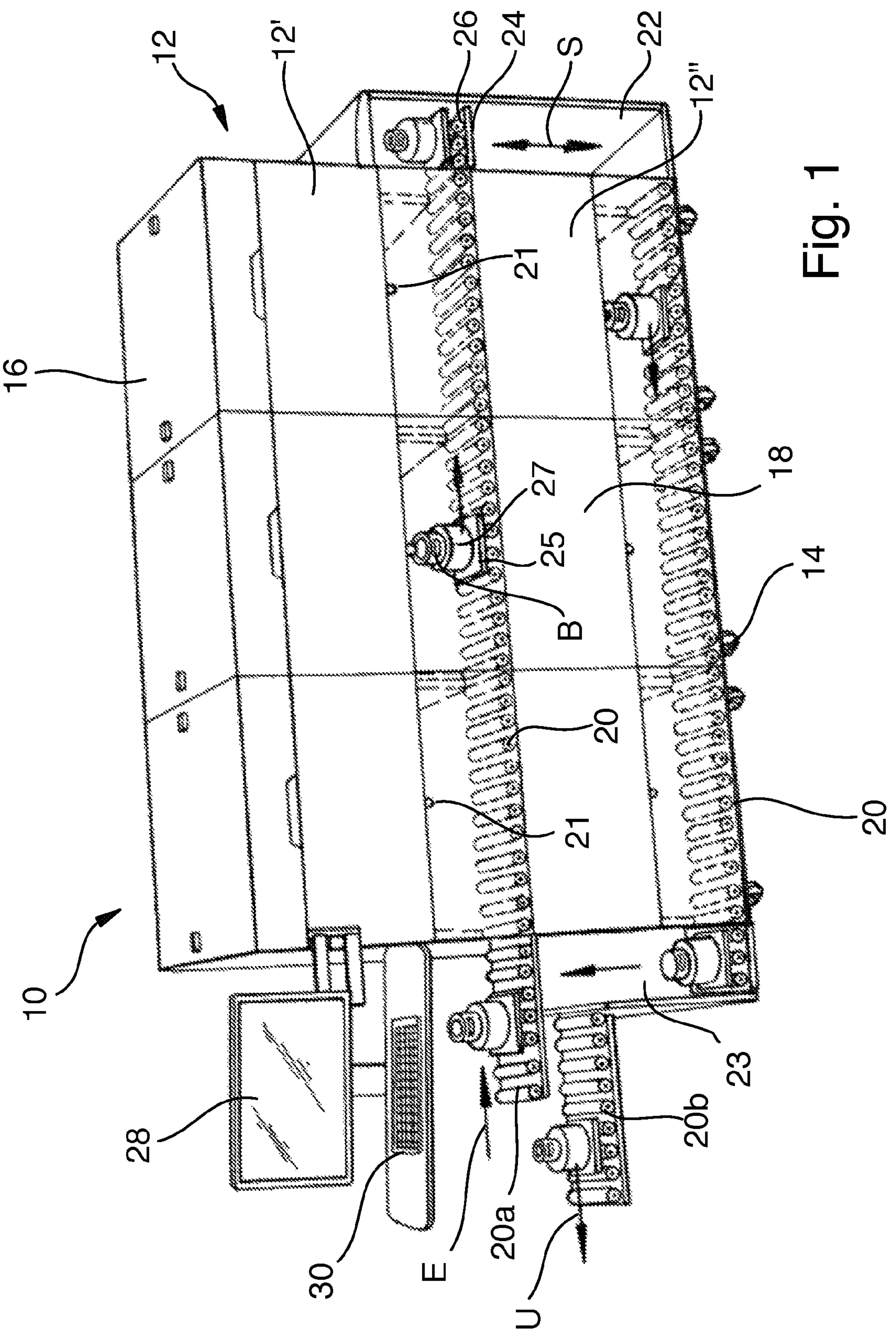
FIG. 1 is a perspective view of an embodiment of a machine for preparing lacquers for bodies incorporating aspects of the present invention, including six dispensing modules which are arranged on two levels.

FIG. 1 is a perspective illustration of an embodiment of the machine 10 for preparing lacquers for bodies and more generally finished fluid products. The machine 10 is modular and is constructed by juxtaposing and functionally connecting a number of dispensing modules which are generally designated 12 in such a manner that they are adjacent to each other in accordance with definable configurations and in accordance with specific requirements. The dispensing modules 12 preferably all have a spatial requirement which is substantially equal even if it is not excluded that the machine may comprise dispensing modules having multiple or submultiple dimensions of the modules 12, for example, dimensions corresponding to a pair of modules 12 which are juxtaposed. The dispensing modules 12 preferably all have similar functions, being capable of dispensing one or more fluid products which are contained in one or more tanks 34 (see FIG. 2) which are received inside the respective dispensing module 12. As will be described in detail below, inside the dispensing modules 12 there are provided dispensing systems which allow the fluid products to be dispensed into containers B which are supplied in the machine 10 from an inlet E as far as an outlet U.

In the embodiment of FIG. 1, there are generally a total of six dispensing modules 12 and they are arranged on two levels: three dispensing modules 12' are arranged on an upper level, positioned above and aligned with three other corresponding dispensing modules 12" which are arranged on a lower level. The dispensing modules 12', 12" on the same level are preferably fixed to each other at a side. Two dispensing modules 12', 12" positioned one above the other are also preferably fixed to each other.

Each upper dispensing module 12' is preferably provided with a cover 16 which affords access to the interior in order to fill or refill tanks 34 of fluid product. However, the lower dispensing modules 12" can be constructed to be removable with a frame structure which is fixed and a carriage or cartridge which is movable on rollers 14. The lower dispensing modules 12" can thereby be removed from the machine 10 at least partially in order to access the tanks 34 and thereby to be able to fill them or refill them.

The front portion of each dispensing module 12 is preferably covered by a front panel 18 which may be completely or partially transparent or semi-transparent. In some cases, the front panel 18 may be able to be opened or removable, completely or partially, in order to afford access when necessary to the front portion of the dispensing module 12, where the fluid products are dispensed into the containers B. In the front portion of each dispensing module 12, there is provided a horizontal transport system for containers B which, in the embodiment of the Figure, is constructed by means of motorized roller conveyors 20. In particular, the motorized roller conveyors 20 comprise roller conveyor portions, each of which has an extent which is substantially equal to the front width of each dispensing module 12 so as to completely cover the entire extent in terms of width of the machine 10, at each of the two levels. Preferably, the roller conveyors 20 extend laterally at a side of the machine 10 in order to define the inlet E and the outlet U for the containers. Alternatively, the inlet E and/or the outlet U of the containers B can be formed by means of other transport systems, such as, for example, transporter belts or robot arms, or more simply by using inclined planes, on which the containers B can slide in order to be introduced into and discharged from the machine 10. Naturally, the transport system for the containers B may be of a type different from the roller conveyor 20 and may completely or partially comprise transporter belts or other systems of the type generally known.

At the side of the machine 10 opposite the inlet E and the outlet U of the containers B, there is provided a vertical transport system for the containers B from one level to another of the machine 10. In particular, in the embodiment of FIG. 1, the vertical transport system comprises a lifter 22 which is capable of receiving at least one container B from a level and transporting it to another level of the machine 10. More specifically, in the non-limiting example of FIG. 1, the lifter 22 comprises a platform 24 which can be moved upwards or downwards, as indicated by the arrow S of FIG. 1. The platform 24 is provided to receive at least one container B which is urged thereon by the roller conveyor 20 of the upper level, and to transfer it onto the roller conveyor 20 of the lower level of the machine 10. In this regard, there may be provided a movement system on the lifter 22 and/or on the platform 24, for example, motorized rollers 26, or any other system which is capable of moving a container B from the platform 24 to the roller conveyor 20 of the lower level. An alternative system to the motorized rollers 26 may comprise a pusher member which is associated with the lifter 22 or other functionally similar systems.

In FIG. 1, the inlet E is aligned with the roller conveyor 20 of the upper level of the machine 10. The inlet E comprises an inlet roller conveyor portion 20*a* on which one or more containers B can be placed so as to be supplied sequentially inside the machine, in particular to the first module 12 of the machine 10. Slightly below the inlet roller conveyor 20*a*, there is provided a similar outlet roller conveyor 20*b* which receives the containers B at the end of the dispensing operations of the fluid products for the production of the lacquers according to the formulations required. The outlet roller conveyor 20*b* receives the containers B from an outlet lifter 23, which is similar to the lifter 22 and which removes them from the outlet of the last dispensing module which the containers B pass through during their path through the machine 10.

In the machine 10, there can be produced formulations of lacquers in different quantities for containers B having different capacities. To this end, the containers B are received in respective adapters 27 which are carried by platforms in the form of slides 25. The adapters 27 allow the opening of containers B having a different height and width to be positioned at the same height and at the centre with respect to dispensing nozzles 21 for fluid products.

There is mounted on the machine 10 an electronic processor which regulates the general operation of the devices, including the control of the dispensing of the fluid products by one or more dispensing modules 12, by coordinating it with the transport of the containers B and the stoppage thereof at the dispensing module(s) from which the fluid products necessary for the specific formulation of lacquer desired are dispensed. Preferably, the functions of the machine 10 and the programming of the formulations, similarly to the calibration and maintenance operations, are carried out by interfacing as known with an operator by means of a screen 28 and a keyboard 30. The calibration can also be carried out individually and independently for each dispensing module 12. Naturally, the programming and the control and the interrogation of the state of the machine can be carried out by means of any other type of data-processing interface and system, for example, by means of a remote administration system, such as a remote server, a cluster of servers, a service or an application in the cloud, as well as a remote terminal which communicates with the machine, for example, a tablet, a smart phone, a computer or any other system of the generally known type.

Figure 2:
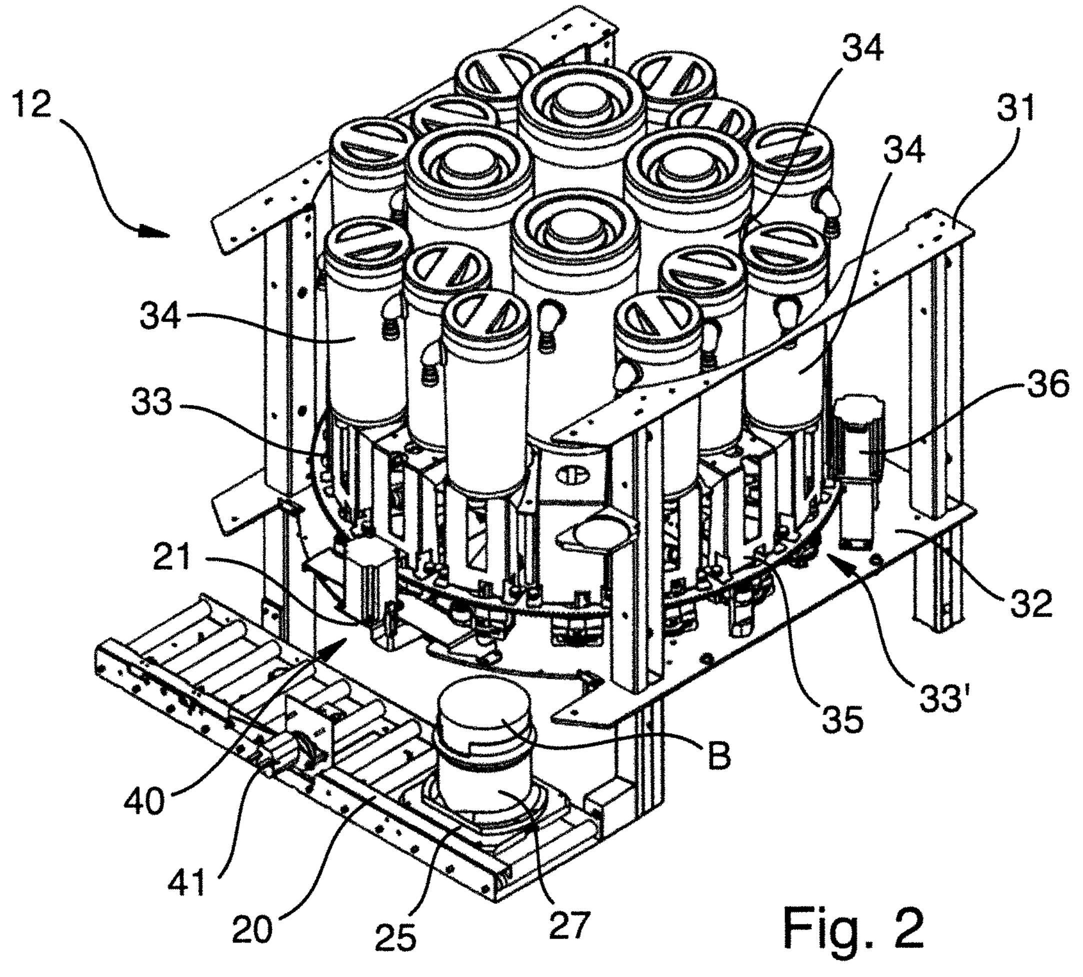
FIG. 2 is a schematic view of the interior of one of the dispensing modules of the machine of FIG. 1.

With reference to FIG. 2, there is illustrated merely by way of example the formation of a dispensing module 12 which, for the sake of clarity of illustration, does not have the external covering casing. As indicated above, for dispensing fluid products there can be used any dispensing device of known type, even if for the construction of the machine 10 it has been found to be particularly advantageous and effective to use the dispensing device which is developed and produced by the same Applicant and which is described in detail in the patent application WO2020/165822, the description content of which is integrally claimed and incorporated herein by reference. Without going into detail, which the person skilled in the art may understand from a reading of the document WO2020/165822, there is set out here an overview of the dispensing device which is preferably used in the machine 10 in order to form the dispensing modules 12, in particular for dispensing a plurality of fluid products.

As can be seen in FIG. 2, a dispensing module 12 may comprise a support structure 31 having a platform 32 which supports a rotary table 33 or turntable. Tanks 34 of fluid products are mounted on the rotary table 33. Each tank 34 is connected to a pumping group 35 arranged below. Inside each tank 34, there is mounted an agitator (not illustrated) for the fluid product which is connected to a mechanism which moves it during the rotation of the rotary table 33. Alternatively, each agitator can be provided with a movement system with autonomous motorization.

A motor 36 is connected to the rotary table 33, for example, by means of the engagement of a pinion with a tooth arrangement 33' which is formed on the periphery of the rotary table 33. In this manner, the rotary table 33 can be rotated selectively, preferably in both rotation directions, so as to carry the desired pumping group 35 into alignment with an operating dispensing zone 40 which is positioned at the front of the dispensing module 12. The roller conveyor 20 is preferably fixed to the support structure 31 and is controlled in known manner by a motor 41 which controls, for example, a system of pulleys and belts which are connected to the rollers of the roller conveyor 20. The roller conveyor 20 can transport and support a slide 25, on which the adapter 27 for a container B is mounted. As a result of the roller conveyor 20, the container B can be transported below the nozzle 21 into the operating dispensing zone 40, in which one or more fluid products which are contained in the tanks 34 can be dispensed inside the container B in accordance with the formulation of lacquer desired.

The pumping group 35 comprises a volumetric pump, for example, an alternating volumetric pump of the type described in the above-mentioned document WO2020/165822. The pump communicates with a respective tank of fluid product 34 through an intake pipe. The pumping group 35 also comprises a valve group. The pump communicates with the valve group which can be switched into different positions so as to dispense the fluid product which is pumped by the pump into a container which is positioned under it and which is supported on the roller conveyor 20. The valve group can be switched in order to carry out precise dispensing, with minimal quantities, for example, in order to obtain a sample of lacquer, or it can be switched in order to dispense greater quantities of fluid product, where necessary to produce a greater quantity of lacquer. The valve group can also be switched in order to carry out the recirculation of the fluid product by re-introducing it into the tank 34.

In the operating dispensing zone 40 there is mounted a motor group for actuating the pump of the pumping group 35 which is located in the operating dispensing zone 40 following the rotation of the rotary table 33. A valve actuator group is also mounted in the operating dispensing zone 40 in order to control the valve group of the pumping group 35 which is located in the operating dispensing zone 40 following the rotation of the rotary table 33.

The dispensing module 12 described above is particularly advantageous because it allows precise dispensing with a very high resolution. The dispensing nozzles always remain clean and the recirculation of the fluid product in the tank 34 is carried out until the last drop. The dispensing module 12 does not need periodic calibration. This results from the fact that the dye dispensing circuits are quite short, the pumping group is not substantially subjected to wear. The dispensing module 12 allows a high level of working flexibility, being able to dispense the same fluid product both in large quantities, with a high flow rate in order to reduce the dispensing times, and in extremely small quantities with great precision and resolution. These particular features of the dispensing module 12 allow a compact machine, having limited dimensions, but still capable of dispensing both into relatively large containers, for example, having the capacity of several litres, and into extremely small containers which are used for samplings, for example, of 100 cc. This constitutes a substantial advantage in the field of retouching operations and repairs for vehicles in the bodies because it is possible initially to produce different samples of formulations of lacquers and to test if it is the most appropriate shade for the retouching work, using in this step minimal quantities of fluid products. Subsequently, the high precision and repeatability of the dispensing modules, as a result inter alia of the volumetric rather than gravimetric dispensing of the fluid products, in addition to all the other technical characteristics set out above, allow the production of a lacquer according to the formulation desired, in the appropriate quantity, with a shade which is identical to the shade of the preselected sample without any need for subsequent corrections or waste of fluid product.

Another advantage of the machine 10 according to the invention is being able to produce finished lacquers without any effort and upon request, both in very small quantities, for sampling and tests, and in great quantities, for example, for re-painting large portions of a vehicle after the tests which have been carried out with the sample have been found to be satisfactory. The machine 10 may, for example, dispense, for example, by controlling a dispensing selector in one or more dispensing modules 12, quantities of fluid product from approximately 20 ml to approximately 1000 ml. This constitutes a substantial saving because the operator can test beforehand a small quantity of finished lacquer and can decide only after a positive inspection to produce all the quantity necessary for repainting the vehicle. To this end, each dispensing module 12 may comprise a dispensing selector in order to selectively dispense small quantities of fluid product for producing samples of lacquers or large ranges of fluid product for rapidly filling large lacquer containers.

Another advantage of the dispensing module 12 is the possibility of completely recirculating the fluid products in the tanks 34 through a dedicated recirculation pipe, which is preferably connected to the tank with spacing from the intake pipe. In this manner, the complete recirculation of the fluid product is promoted, which promotes the elimination of air from the fluid product and prevents the drying out or the separation of the fluid product. The recirculation operation of the fluid products in the tanks 34 can be carried out at regular intervals, for example, in the recirculation downtimes of the dispensing module 12, so as to also keep the fluid products which are used less frequently, but which are nevertheless equally costly with respect to the products used more frequently, in a state mixed and ready for use.

Figure 3:
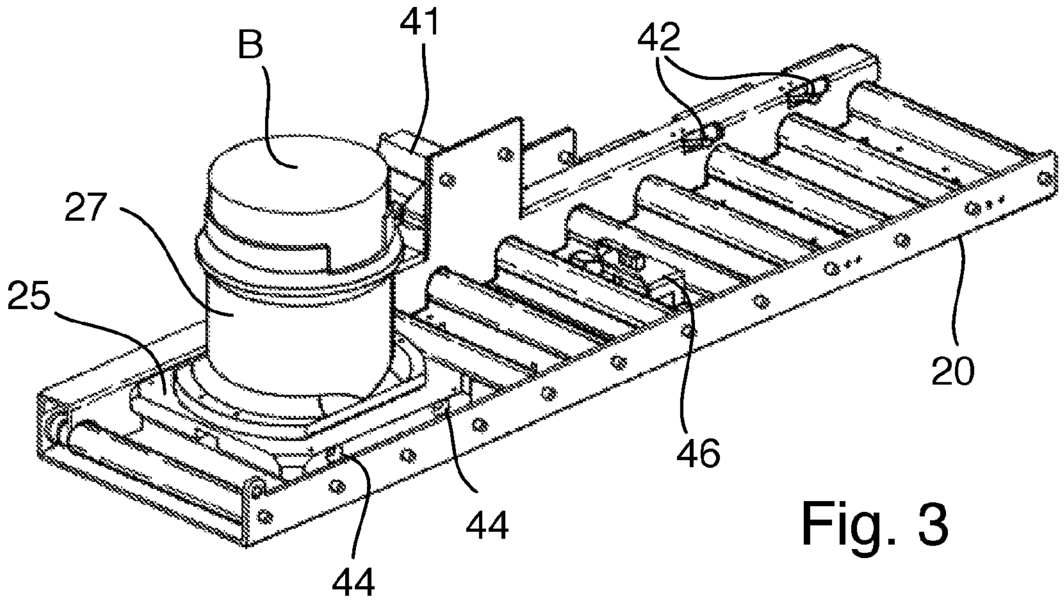
FIG. 3 is a perspective view of a roller conveyor portion for supplying containers to the machine of FIG. 1.
Figure 4:
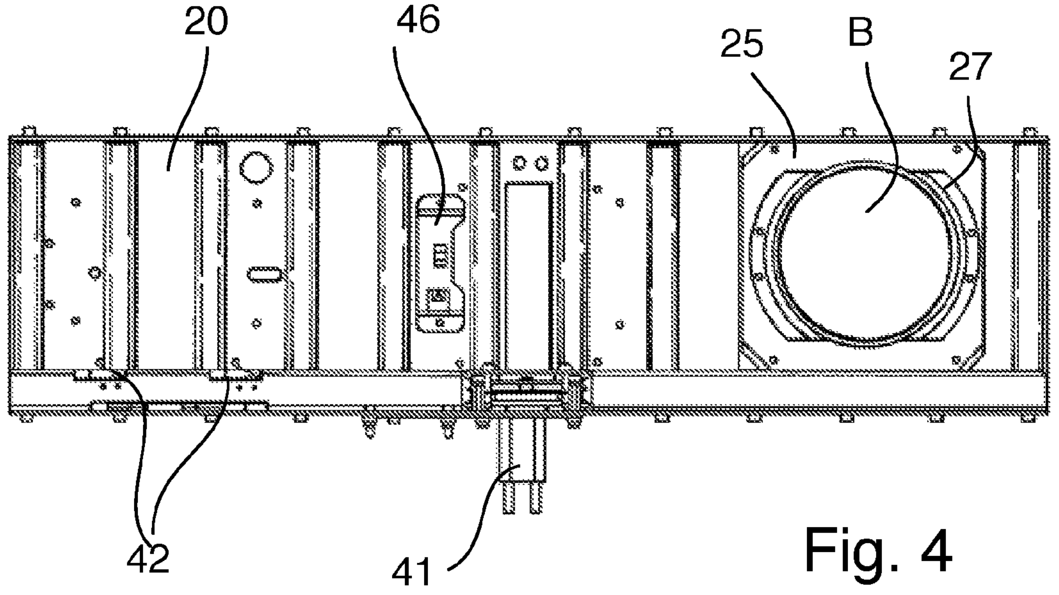
FIG. 4 is a plan view of the roller conveyor of FIG. 3.

FIGS. 3 and 4 illustrate in greater detail a roller conveyor 20, the features of which are similar to those of the inlet roller conveyor 20*a* and outlet roller conveyor 20*b*. The roller conveyor 20 comprises a pair of micro-switches 42 which detect the presence or absence of two corresponding screws which can be screwed so as to project at the side of the slide 25 into holes 44. The presence or absence of the two screws constitutes a recognition code of the dimensions of the container B which is received on the slide 25 with the adapter 27. There can substantially be formed four combinations of presence/absence of screws in the holes 44 which can be detected/not detected by the micro-switches 42 in order to establish the size of the container B on the slide 25. The mechanical detection system for the dimensions of the containers B which are carried by the slides 25 constitutes a security element for preventing the dispensing of an incorrect quantity of fluid products in the machine from exceeding the capacity of the container being processed. Naturally, it is possible to provide another physical detection system for the characteristics of the container B, for example, by means of sensors of different types, or by means of artificial vision systems. The number of screws and micro-switches may also be different from that set out, a single screw being sufficient to identify with the presence/absence thereof two formats of different containers. Generally, there is needed a number n of screws for identifying a number of different containers which is at most equal to 2^n possible combinations of absence/presence of the screws or the other elements which is capable of being detected in on/off modes by the micro-switches 42 or by sensors with similar functionalities.

It is possible to arrange on the roller conveyor 20 a proximity sensor 46 which detects the presence of the slide 25, for example, in a central position, corresponding to the operating dispensing zone 40 for the correct centring of the opening of the container B under the dispensing nozzle. In the zone of the roller conveyor 20 corresponding to the operating dispensing zone 40, it is also possible to provide a weighing device which is formed, for example, by means of load cells which are associated with the rollers of the roller conveyor 20, in order to weigh the container B if it is necessary or desirable to control the fluid products being dispensed into the container B by weight.

Figure 5:
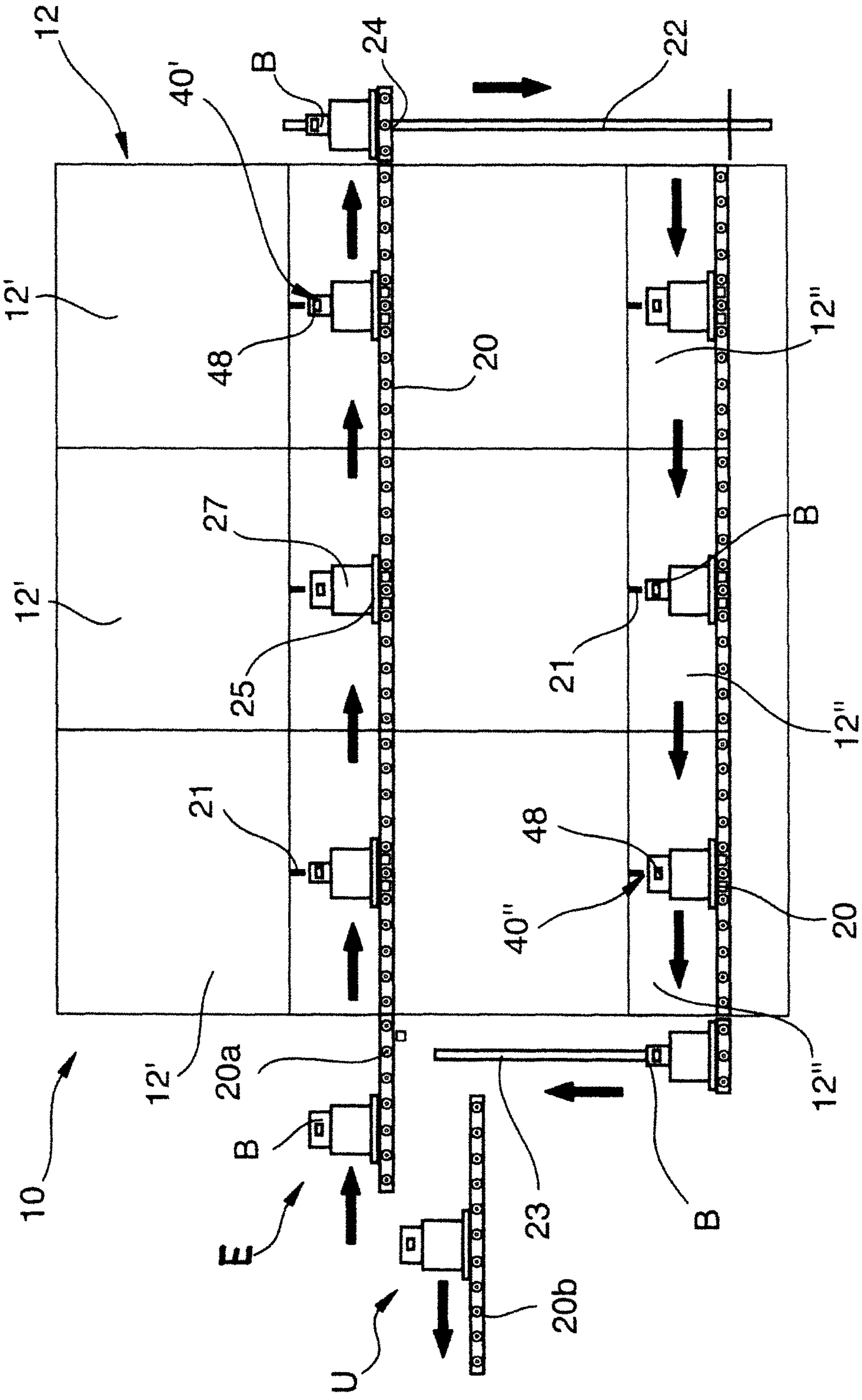
FIG. 5 is a schematic front view of the movement of the containers of fluid products in the machine of FIG. 1.

FIG. 5 schematically illustrates the movement of the containers of fluid products inside the machine of FIG. 1. The vertical transport system arranged between the upper level and the lower level of the machine 10, which in the non-limiting example of the Figure is formed by means of the lifter 22, is integrated in the horizontal transport system of the containers B, which in the non-limiting example of the Figure is formed by means of the roller conveyors 20. There is thereby generally defined a continuous transport system for the containers B from the inlet E to the outlet U, as schematically depicted in FIG. 5. The arrows indicate the progressive path of the containers B in the machine 10. At the inlet E, the containers B are empty and are preferably placed on the inlet roller conveyor 20*a*. The containers B are inserted in the respective adapters 27 which are mounted on the slides 25.

Each container B is provided with an identification code 48, for example, a bar code, QR code, an RFID tag or other identification code which is, for example, applied to the container B with an adhesive or printed or using another known system. The identification code 48 is associated with a corresponding formulation in the electronic processor. The identification code can be read when the container B is introduced into the machine 10 in order to carry out the correct dispensing of the fluid products necessary for the formation of the corresponding formulation.

Before the inlet into the first dispensing module 12, the identification code 48 of a container B is read so as to retrieve the relative formulation from the memory of the processor. The dimensions of the container B are then checked with the detection system with micro-switches described above. If the dimensions of the container B do not correspond to those associated with the identification code 48, there is generated a warning or an alarm and the container B does not continue into the machine 10. It is further possible to check whether there is a sufficient quantity in the machine 10, in the various tanks 34, of all the fluid products necessary for producing the formulation. If a predetermined fluid product is not present at sufficient quantities, there is generated a warning or an alarm and the container B does not continue into the machine 10. In fact, the quantities of fluid product present in each tank 34 are stored in the machine 10. The stored quantities are updated, in an increasing manner, after each filling or refilling operation of a tank 34. The quantities stored are further updated, in a decreasing manner, before each fluid product is dispensed so that the stored quantity is always precise or at most too low with respect to the real quantity if an interruption to the electrical energy occurs during the dispensing operation.

The containers B are transported along the upper level of the dispensing modules 12', where they can where applicable be filled with one or more fluid products by being located below the operating dispensing zones 40' of the upper level. From the upper level, the containers B are lowered by the lifter 22 to the lower level of the dispensing modules 12", where they can where applicable be filled with one or more fluid products by being located below the respective operating dispensing zones 40" of the lower level. The containers B are then raised by the lifter 23 in order to be transferred to the outlet U, where there is preferably arranged the outlet roller conveyor 20*b*, by which it is possible to remove the containers B with the finished lacquers in accordance with the various formulations which are programmed in the machine 10.

A particular feature of the machine 10 is the fact that a plurality of containers B can be moved simultaneously, each of which can be transported under a given dispensing module 12 for dispensing specific fluid products which are defined by the formulation of lacquer desired. This flexibility of transport of the containers B inside the machine 10, together with the distributed presence of the various fluid products in the various dispensing modules 12, allows a greater productivity than the known machines to be obtained, together with a more articulated automation which avoids the presence of an operator at the start and end of the preparation of each formulation of lacquer.

FIG. 5 illustrates the most "overcrowded" case, in a manner of speaking, in which the machine 10 manages and controls the simultaneous movement of containers B which are positioned in the dispensing zone of a respective dispensing module 12, on the lifters 22 and 23, and on the inlet roller conveyors 20*a* and 20*b*. In accordance with the length thereof, there can be lined up a plurality of containers B which are at the inlet and at the outlet and which are introduced and removed automatically to/from the machine 10 gradually as the formulations of lacquers progress. FIG. 5 depicts the more general example, in which the containers B have different dimensions. The machine 10 is capable of processing equally well the production of samples of lacquers, for example, of 100 ml or less, for example, also of 20 ml, and the production of greater quantities, up to 1000 ml and sometimes even more, for example, for retouching and repair operations of great surfaces of bodies of motor vehicles. Furthermore, it is not necessary for the containers B to be moved sequentially in the machine 10 by necessarily being located under the dispensing zone of each dispensing module 12. For example, if, for the formulation of a lacquer, it is necessary to dispense fluid products which are stored only on-board the last dispensing module 12, the container B can be transported directly without any additional interruptions into this position, provided that along the transport path there are not present any other containers B which are in a stopped state for receiving the dispensing of fluid products in any intermediate dispensing module 12.

In the preceding description, reference has been made by way of example to the machine of FIGS. 1 and 5, in which the dispensing modules 12 are arranged on two levels with three modules each. If the dispensing modules 12 each comprised 16 tanks, the machine as described herein is capable of processing lacquers, the formulations of which comprise any number of components which are selected from a maximum number of 96 potentially different components. This configuration allows the maximum capacity of use required by some of the more complex systems for formulating lacquers for the current needs for repairing and retouching bodies, particularly in the case in which the formulation system requires fluid products to be mixed in proportions which are not too dissimilar to each other.

Other systems for formulating lacquers also provide for one or more bases or resins which constitute approximately 50% of the total of the lacquer to be dispensed. In order to comply with these formulation requirements, one or more dispensing modules 12 can be configured so as to dispense a single base which is stored in a tank with large dimensions and which is received in the dispensing module 12 or, if necessary, which is positioned outside the machine 10. Preferably, the dispensing of the base or bases is carried out after the dyes have been dispensed inside the container B, which is initially empty. The one or more dispensing modules 12 which are dedicated to dispensing the bases are therefore arranged at the end of the path of the containers B, slightly before the outlet U of the machine.

The modularity of the machine also allows different requirements to be met, for example, where the space available is small, or if it is necessary to manage a smaller number (or also a larger number) of fluid products or to store greater quantities thereof, for example, for specific products with a wider use.

In relation to this last requirement, it is possible to dedicate more than one tank 34, in the same dispensing module or in different dispensing modules, to the same fluid product. This allows the production of a greater stored reserve of one or more fluid products with more frequent use, leaving, for example, only one tank dedicated to products with less frequent use. For example, if a fluid product is used in the majority of formulations, it could be stored in more than one dispensing module 12 so as to allow the simultaneous formulation of a plurality of lacquers having the same fluid product, and the simultaneous dispensing into a plurality of containers B which are arranged under different dispensing modules 12.

Figure 6A:
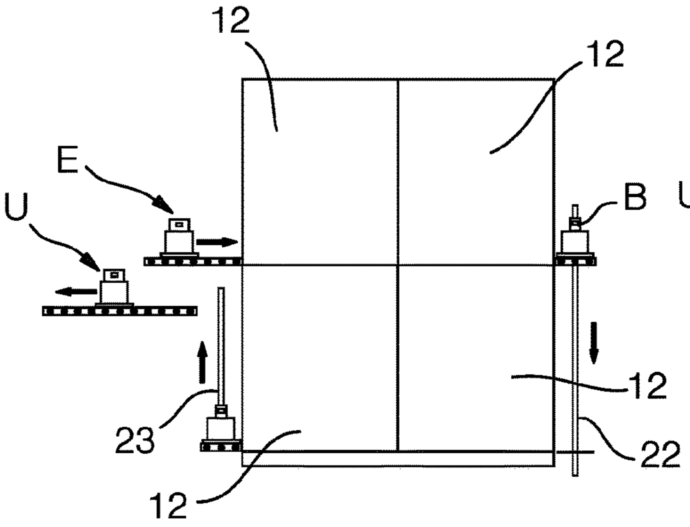
FIGS. 6*a*-6*d* schematically show additional embodiments of possible arrangements and combinations of dispensing modules for producing other embodiments of the machine for preparing lacquers of the present invention.

If it is necessary to use and manage a reduced number of fluid products, the machine can be configured as in the example of FIG. 6*a*, which does not have, with respect to FIGS. 1 to 5, the pair of central dispensing modules 12. The configuration of the example of the machine illustrated in FIG. 6*a* thus comprises two levels, each of which comprises two juxtaposed dispensing modules 12. In the case of dispensing modules which each comprise sixteen tanks of fluid product, this configuration of the machine is capable of storing and dispensing a maximum of sixty four different fluid products.

Figure 6B:
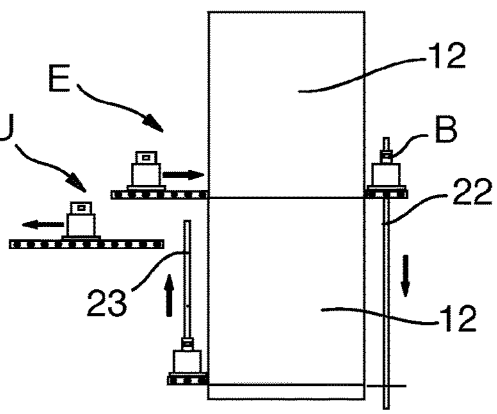

If the number of fluid products to be stored and managed is even less, the machine can be configured as in the example of FIG. 6*b*, which provides only for two dispensing modules 12 which are positioned one above the other and which are operationally connected by a lifter 22. The machine of FIG. 6*b* also provides, as in the preceding examples, for an outlet lifter 23. In the case of dispensing modules each comprising sixteen tanks of fluid product, this configuration of the machine is capable of storing and dispensing a maximum of thirty two different fluid products and simultaneously managing in the machine three different containers B. The space occupied by the machine of FIG. 6*b* is minimal because the outline is limited to the width and the depth of a single dispensing module 12.

Figure 6C:
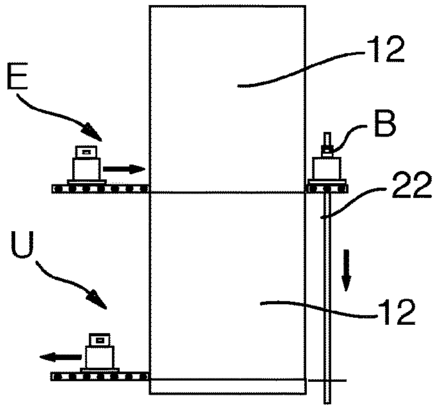

In the example of FIG. 6*c*, there is illustrated a simpler variant of the machine of FIG. 6*b* without the outlet lifter 23. The containers B are urged onto an outlet roller conveyor which may be motorized or idle. Alternatively, there may be provided a simple outlet platform which is preferably inclined in a chute-like manner in order to promote the discharge of the containers B from the machine. This configuration maintains the main characteristics of the machine of FIG. 6*b* but is more economical. A similar solution, with a platform or chute, for discharging the containers B may naturally be used in any machine configuration, regardless of the number of dispensing modules 12 which form it.

Figure 6D:
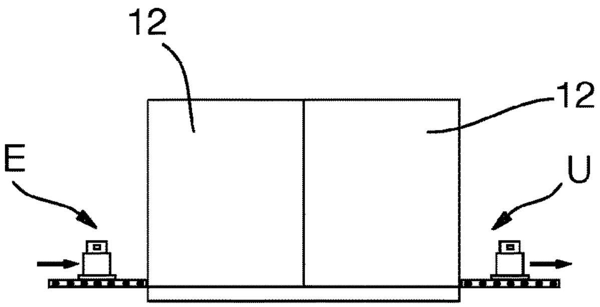

In the example of FIG. 6*d*, there is illustrated a variant of the machine which is even simpler, wherein two dispensing modules 12 are positioned side by side. The machine of the example of FIG. 6*d* does not provide for any lifter because the path of the containers B extends from the inlet E at one side of the machine 10 and develops horizontally through the dispensing modules 12 as far as the outlet U.

What is set out above provides indications for a person skilled in the art for producing different configurations of machines from those illustrated, also using only one dispensing module 12, or by combining a given number thereof in various manners, on one or more levels, by providing vertical transport systems for transferring containers from one level to another, and horizontal inlet and outlet transport systems which are combined continuously with the transport systems of the containers on-board each module 12.

The modular configuration of the machine 10 does not exclude the fact that, in place of two or more dispensing modules, there can be introduced a special component having dimensions which are equal to a corresponding multiple of dispensing modules. For example, there may be provided a special dispensing module having a height and depth which are equal to one of the dispensing modules 12 and, for example, double the width. Such a special double dispensing module could, for example, receive a dispensing system which is supplied by large tanks in order to dispense in large quantities bases and resins in a formulation system which provides for them.

Naturally, the principle of the invention remaining the same, the forms of embodiment and details of construction may be varied widely with respect to those described and illustrated, without thereby departing from the scope of the present invention.

The invention claimed is:

1. A machine for preparing fluid products, comprising:

at least two dispensing modules for dispensing measured quantities of at least one fluid product in order to obtain a finished fluid product, the dispensing modules being disposed adjacent one another and being positioned one above the other and defining at least two levels of the machine, each dispensing module comprising:

at least one module inlet;

at least one module outlet different from the at least one module inlet;

at least one operating dispensing zone, at least one container being selectively locatable in the at least one operating dispensing zone;

at least one pump device for dispensing upon request measured quantities of at least one fluid product in the at least one operating dispensing zone;

at least one tank for fluid products connected to the at least one pump device; and at least one transport device for transporting at least one container from the at least one module inlet to the at least one module outlet by passing the at least one container through the at least one operating dispensing zone;

the machine further comprising:

at least one machine inlet for introducing to the machine the at least one container;

at least one machine outlet different from the at least one machine inlet for removing from the machine the at least one container;

a transport path for the at least one container, the transport path being defined between the at least one machine inlet and the at least one machine outlet, the at least one machine inlet being disposed to communicate, with continuity of transport, with the at least one module inlet of one of the dispensing modules and the at least one machine outlet communicating, with continuity of transport, with the at least one module outlet of one of the dispensing modules, the transport path being configured to sequentially pass through all of the dispensing modules between the at least one machine inlet and the at least one machine outlet, the at least one transport device of each of the dispensing modules transporting the at least one container along the transport path, and the at least one container being selectively locatable in one or more of the at least one operating dispensing zones to receive a predetermined measured quantity of fluid products; and at least one vertical transport device configured for transporting the at least one container from one level to another along the transport path from the at least one machine inlet to the at least one machine outlet.

2. The machine according to claim 1, further comprising at least one additional vertical transport device configured for lifting the at least one container from the at least one module outlet of one of the dispensing modules to the at least one machine outlet of the machine located at a higher level than the at least one module outlet of the one dispensing module.

3. The machine according to claim 1, wherein the at least one vertical transport device comprises a lifter or an elevator or a descender.

4. The machine according to claim 1, wherein each level of the at least two levels comprises one, two or three of the dispensing modules, each of the dispensing modules comprising sixteen tanks of fluid products.

5. The machine according to claim 1, wherein the at least one transport device of each of the dispensing modules comprises horizontal transport members comprising motorized roller conveyors.

6. The machine according to claim 1, wherein the machine dispenses fluid products into a plurality of individual containers and further comprises a plurality of platforms, each of the platforms being configured for individually transporting one container along the transport path.

7. The machine according to claim 6, further comprising a plurality of adapters each configured for receiving one container, each of the platforms transporting one container inserted in one adapter.

8. The use of a machine according to claim 1, wherein the machine dispenses fluid products into individual containers and is for preparing formulations defined by a user, each formulation comprising a plurality of fluid products to be dispensed into a respective one of the containers, the fluid products being stored in the at least one tank of each of the dispensing modules, the formulations each being associated with a respective identification code applied to one of the containers, wherein preparation of a formulation includes introduction of one of the containers into the machine through the at least one machine inlet before the container, in which a preceding formulation of the sequence is prepared, is discharged from the at least one machine outlet of the machine.

9. The use of a machine according to claim 8, wherein, during an introduction of one of the containers into the machine, the identification code is read in order to retrieve a stored formulation associated with the identification code.

10. A method for preparing formulations defined by a user from a plurality of fluid products to be dispensed, the method comprising the steps of:

storing a group of formulations of finished fluid products each comprising a plurality of fluid products to-be dispensed;

supplying to the at least one machine inlet of the machine according to claim 1 a plurality of containers, each container being provided with an identification code associated with one of the formulations of finished fluid products;

retrieving the stored formulation associated with the identification code;

transporting the containers in the machine along the transport path so that the containers sequentially pass the dispensing modules and are located under one or more of the operating dispensing zones, the one or more operating dispensing zones being predetermined by the respective formulation of finished fluid product associated with the identification code on the container and then discharging the container from the at least one machine outlet; and starting the dispensing of fluid products into a container before the container associated with a preceding formulation is discharged from the at least one machine outlet of the machine.

11. The machine according to claim 1, wherein the dispensing modules are each self-contained and configured for autonomous operation.

12. A machine for preparing fluid products, comprising:

at least two dispensing modules for dispensing measured quantities of at least one fluid product in order to obtain a finished fluid product, the dispensing modules being disposed adjacent one another, each dispensing module comprising:

at least one module inlet;

at least one module outlet different from the at least one module inlet;

at least one operating dispensing zone, at least one container being selectively locatable in the at least one operating dispensing zone;

at least one pump device for dispensing upon request measured quantities of at least one fluid product in the at least one operating dispensing zone;

at least one tank for fluid products connected to the at least one pump device; and at least one transport device for transporting at least one container from the at least one module inlet to the at least one module outlet by passing the at least one container through the at least one operating dispensing zone;

the machine further comprising:

at least one machine inlet for introducing to the machine the at least one container;

at least one machine outlet different from the at least one machine inlet for removing from the machine the at least one container; and a transport path for the at least one container, the transport path being defined between the at least one machine inlet and the at least one machine outlet, the at least one machine inlet being disposed to communicate, with continuity of transport, with the at least one module inlet of one of the dispensing modules and the at least one machine outlet communicating, with continuity of transport, with the at least one module outlet of one of the dispensing modules, the transport path being configured to sequentially pass through all of the dispensing modules between the at least one machine inlet and the at least one machine outlet, the at least one transport device of each of the dispensing modules transporting the at least one container along the transport path, and the at least one container being selectively locatable in one or more of the at least one operating dispensing zones to receive a predetermined measured quantity of fluid products;

wherein the dispensing modules are each configured for independent operation and the at least one transport device of each dispensing module is actuable independently from the at least one transport device of all other dispensing modules.

13. A machine for preparing fluid products, comprising:

at least two dispensing modules for dispensing measured quantities of at least one fluid product in order to obtain a finished fluid product, the dispensing modules being disposed adjacent one another, each dispensing module comprising:

at least one module inlet;

at least one module outlet different from the at least one module inlet;

at least one operating dispensing zone, at least one container being selectively locatable in the at least one operating dispensing zone;

at least one pump device for dispensing upon request measured quantities of at least one fluid product in the at least one operating dispensing zone;

at least one tank for fluid products connected to the at least one pump device; and at least one transport device for transporting at least one container from the at least one module inlet to the at least one module outlet by passing the at least one container through the at least one operating dispensing zone;

the machine further comprising:

at least one machine inlet for introducing to the machine the at least one container;

at least one machine outlet different from the at least one machine inlet for removing from the machine the at least one container; and a transport path for the at least one container, the transport path being defined between the at least one machine inlet and the at least one machine outlet, the at least one machine inlet being disposed to communicate, with continuity of transport, with the at least one module inlet of one of the dispensing modules and the at least one machine outlet communicating, with continuity of transport, with the at least one module outlet of one of the dispensing modules, the transport path being configured to sequentially pass through all of the dispensing modules between the at least one machine inlet and the at least one machine outlet, the at least one transport device of each of the dispensing modules transporting the at least one container along the transport path, and the at least one container being selectively locatable in one or more of the at least one operating dispensing zones to receive a predetermined measured quantity of fluid products;

wherein the at least one transport device of each dispensing module is a separate and independently-operable component from the at least one transport device of all other dispensing modules.

* * * * *